US008888626B2

(12) United States Patent
deJong et al.

(10) Patent No.: US 8,888,626 B2
(45) Date of Patent: Nov. 18, 2014

(54) TENSIONING SYSTEM WITH SELF-LOCKING MECHANISM

(75) Inventors: Joannes N. M. deJong, Hopewell Junction, NY (US); Lloyd A. Williams, Mahopac, NY (US); Matthew Dondiego, West Milford, NJ (US)

(73) Assignee: Xerox Corporation, Norwalk, CT (US)

( * ) Notice: Subject to any disclaimer, the term of this patent is extended or adjusted under 35 U.S.C. 154(b) by 1052 days.

(21) Appl. No.: 12/636,832

(22) Filed: Dec. 14, 2009

(65) Prior Publication Data
US 2011/0143873 A1  Jun. 16, 2011

(51) Int. Cl.
  F16H 7/12  (2006.01)
  F16H 7/08  (2006.01)

(52) U.S. Cl.
  CPC .............. *F16H 7/129* (2013.01); *F16H 7/0848* (2013.01); *F16H 2007/0808* (2013.01); *F16H 2007/0851* (2013.01); *F16H 2007/0893* (2013.01); *F16H 2007/0806* (2013.01)
  USPC .......................... 474/135; 474/133

(58) Field of Classification Search
  USPC .......................... 474/111, 117, 135
  See application file for complete search history.

(56) References Cited

U.S. PATENT DOCUMENTS

| 2,210,276 | A | * | 8/1940 | Bremer | 474/110 |
|---|---|---|---|---|---|
| 3,426,606 | A | * | 2/1969 | Hopkins | 474/111 |
| 4,145,934 | A | * | 3/1979 | Sragal | 474/135 |
| 4,395,250 | A | * | 7/1983 | King | 474/111 |
| 4,395,251 | A | * | 7/1983 | King et al. | 474/111 |
| 4,402,677 | A | * | 9/1983 | Radocaj | 474/138 |
| 4,473,362 | A |   | 9/1984 | Thomey et al. | |
| 4,505,691 | A | * | 3/1985 | Kohler | 474/101 |
| 4,678,354 | A | * | 7/1987 | Olsen | 400/335 |
| 5,098,347 | A | * | 3/1992 | Sajczvk et al. | 474/135 |
| 5,328,415 | A | * | 7/1994 | Furutani et al. | 474/112 |
| 5,938,552 | A | * | 8/1999 | Serkh | 474/135 |
| 6,689,001 | B2 | * | 2/2004 | Oliver et al. | 474/134 |
| 6,849,015 | B2 | * | 2/2005 | Markley et al. | 474/111 |
| 2001/0046913 | A1 | * | 11/2001 | Rapkin et al. | 474/117 |
| 2003/0109342 | A1 | * | 6/2003 | Oliver et al. | 474/134 |
| 2004/0152548 | A1 |   | 8/2004 | Markley et al. | |
| 2007/0155557 | A1 | * | 7/2007 | Horst et al. | 474/117 |

* cited by examiner

*Primary Examiner* — Henry Liu
(74) *Attorney, Agent, or Firm* — Hoffmann & Baron, LLP

(57) ABSTRACT

According to aspects illustrated herein, there are provided methods and systems for applying continuous tension on a belt/cable system. The automatic tensioning system includes a pivot mechanism and a locking mechanism. The pivot mechanism includes a pivot arm extending between an idler pulley and a pivot point. The idler pulley is mateable with a belt/cable. The belt/cable is routed about the idler pulley. The idler pulley rotates by the movement of the belt/cable, and the pivot arm pivots in an opposing direction from the belt/cable at the pivot point to apply continuous tension to the belt/cable as the pivot arm pivots. The locking mechanism is in communication with the pivot arm to secure the pivot arm in position, and the locking mechanism is adjustable.

7 Claims, 3 Drawing Sheets

TENSIONING SYSTEM WITH SELF-LOCKING MECHANISM

FIELD OF THE INVENTION

This disclosure generally relates to a tensioning system that continuously maintains proper tension on belt, cable or chain drives. Specifically, this disclosure relates to a pivotable device that provides minimum static tension without limiting the maximum dynamic belt tension.

BACKGROUND OF THE INVENTION

Belt/cable tensioners are generally well known devices that have been used previously in many belt/cable-drive systems to prevent loose belts/cables which give inaccurate control of the driven wheel. In addition, loose belts/cables have a low stiffness, which causes a low servo bandwidth which result in inaccurate control of the driven wheel velocity or position. A tensioner is used to apply a belt-tensioning force which compensates for increases in belt/cable length due to wear and other factors.

A loading idler is used to countermeasure the loose belt/cables. The idler rides in a slot. A force is applied to the idler, which in turn loads the belt/cable. Springs, air or hydraulic pistons are examples of method of applying a force. However, any of these methods of applying the force results in a lower stiffness of the drive system. The relation between driven wheel angle and motor angle is represented by a softer spring. This introduces more error and a lower servo bandwidth. A solution to this problem is to lock the idler in place after the force has established the tension. However, during the life of the drive system, belts and cables stretch which results in a loose belt/cable with the errors as described above.

Another type of belt/cable tensioner has a fixed structure such as a pre-tensioned spring mounted on an idler roll or pulley assembly to set the tension in a belt/cable or cable driven system. The idler is locked in place after the tension is preset. A locking mechanism secures the pre-set tension against the stiffness of the spring. However, the belt/cable extends during use and the pre-set tensioner does not compensate for the changes in the belt/cable length during use.

Another type of tensioner system consists of a ratcheting mechanism. As the belt/cable lengthens the tensioning arm rotates in one direction to the next setting. However, the ratcheting system has an arm that moves in a stepwise motion to move to the next tooth position, there is not a continuous and appropriate distributed force allowed with a ratchet system.

There is a need for a tensioning system that provides an automatic and continuous force against the belt/cable throughout the use of the belt/cable. There is a need for a tensioning system that insures proper tensioning against the belt/cable to prevent premature stretching and wearing of the belt/cable. There is a need for a tensioning system that insures minimum static belt/cable tension without limiting the maximum dynamic belt/cable tension, thus enabling higher bandwidth servo controls.

SUMMARY OF THE INVENTION

According to aspects illustrated herein, there is provided an automatic tensioning system, including a pivot mechanism and a locking mechanism. The automatic tensioning system provides minimum static belt/cable tension without limiting maximum dynamic belt/cable tension. The pivot mechanism includes a pivot arm extending between an idler pulley and a pivot point. The idler pulley is mateable with a belt/cable, and the belt/cable is routed about the idler pulley. The idler pulley rotates by the movement of the belt/cable. The pivot arm pivots in an opposing direction from the belt/cable at the pivot point to apply the minimum static tension to the belt/cable as the pivot arm pivots. The locking mechanism is in communication with the pivot arm to secure the pivot arm in position. The locking mechanism is adjustable. As the belt/cable stretches, the pivot arm moves so as to maintain the minimum static tension, the automatic locking mechanism prevents the pivot arm from moving in a direction that would decrease the belt/cable tension.

According to another aspect illustrated herein, there is provided an automatic tensioning mechanism including a pulley mechanism, a locking mechanism and a pivot arm. The pulley mechanism includes a one-way clutch shaped pulley, a pulley rod and a stopper. The rod extends between the pulley and the stopper. The belt/cable extends about the pulley, and the pulley is attached to the pulley rod to allow for free rotation of the pulley. The locking mechanism includes a wedge plate, a wedge element, a pair of rods and a pair of compression springs. The pair of rods extends from the wedge plate. The pair of rods extends through the wedge element. The pair of compression springs extends about the pair of rods. The wedge element is located on the pair of rods between the wedge plate and the pair of compression springs. The pivot arm pivots about a pivot point. The pivot arm is located between the stopper and the wedge element. The pulley rod extends from the pulley through the wedge element, between the pair of springs, through the pivot arm to the stopper.

According to a further aspect illustrated herein, there is provide a method of automatically providing tension to a cable, including the steps of attaching a belt/cable around an idler pulley, the belt/cable rotates freely about the idler pulley; attaching a pivot arm to the idler pulley, the pivot arm extends between the idler pulley and a pivot point, the pivot arm pivots in an opposing direction from the belt/cable at the pivot point to apply tension to the belt/cable; and applying continuous and adjustable tension to the belt/cable using a locking mechanism. The locking mechanism is in communication with the pivot arm. The locking mechanism applies continuous force against the pivot arm, the pivot aim pivots away from the belt/cable. The idler pulley pulls on the belt/cable until the belt/cable and idler pulley are at rest, and to maintain continuous tension on the belt/cable.

Additional features and advantages will be readily apparent from the following detailed description, the accompanying drawings and the claims. It is to be understood, however, that the drawings are designed as an illustration only and not as a definition of the limits of the disclosure.

DETAILED DESCRIPTION OF THE PREFERRED EMBODIMENT

The systems disclosed herein use tensioning system which provides the minimum static and proper tension on the belt/ cable throughout the usage of the device without limiting the maximum dynamic belt/cable tension.

As used herein, the phrase "belt/cable" refers to chain, belt, cable, flat belt, timing belt, vee belt, film belt and the like.

As used herein, the phrase "one-way clutch" refers to unidirectional clutch, freewheeling clutch, overrunning clutch, roller-ramp clutch, sprag clutch, or a member that transmits a drive when input rotated in one direction but releases and freewheels or slips when it is turned in an opposite direction.

Figure 1:
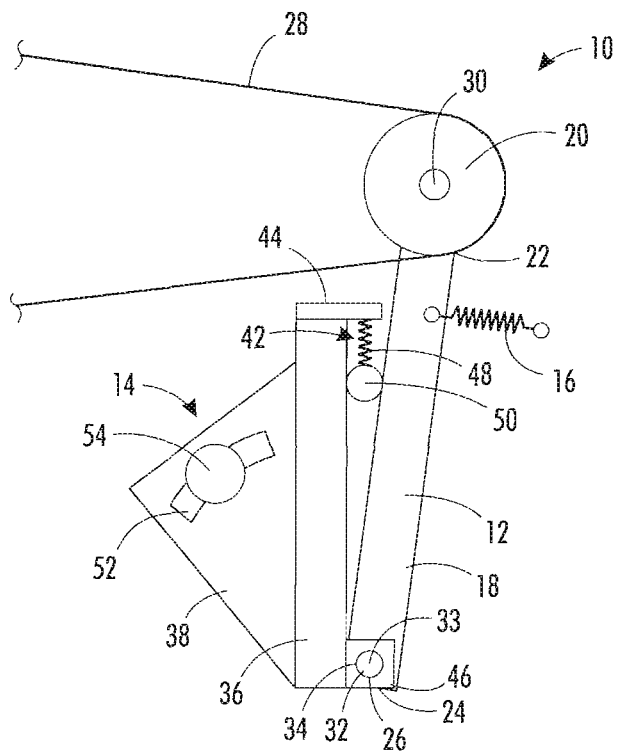
FIG. 1 shows an automatic belt/cable tensioning system of a drive device.

FIG. 1 shows a tensioning system device 10 including a pivot mechanism 12, locking mechanism 14 and a tension spring 16. The pivot mechanism 12 includes an elongated pivot arm 18 with an idler pulley 20 mounted at first end 22 and a pivot point 26 at the second end 24. The pivot arm 18 is generally rectangular in-shape. A belt/cable 28 is routed over and about the idler pulley 20. The idler pulley 20 is attached to the pivot arm 18 by a fastener 30 such that the idler pulley 20 is able to rotate about the fastener 30 on the pivot arm 18. A tension spring 16 is attached to the pivot arm 18 between the idler 20 and the pivot point 26. The tension spring 16 sets the tension in the belt/cable 28. The tension spring 16 extends between the pivot arm 18 and a support structure(not shown). The pivot point 26 includes an attachment mechanism 32 that is capable of pivotably attaching the pivot arm 18 to the locking mechanism 14. The pivot point 26 is a hole though the pivot arm 18, a hole 33 through the locking mechanism 14 and a pin 34 extending therethough connecting the pivot arm 18 to the locking mechanism 14. As the belt/cable stretches, the tension spring 16 causes the pivot arm 18 to rotate clockwise at the pivot point 26. The pivot arm 18 pivots away from the locking mechanism 14, away from the cable motor and in the direction of the force from the tension spring 16 to provide tension in the belt/cable 28.

FIG. 1 shows a locking mechanism 14 pivotably attached to the pivot mechanism. The locking mechanism 14 includes an elongated wedge plate 36, a wedge wing 38 and a preloaded wedging element 42. The wedge plate 36 extends adjacently opposed to the pivot arm 18. The wedge plate 36 is generally rectangular elongated portion with a top cap 44 and a pivot attachment plate 46. The cap 44 is attached to the top of the wedge plate 36 and extends beyond the perimeter of the wedge plate 36 on one side such that the cap 44 and the wedge plate 36 have an L-shaped geometry. The pivot attachment plate 46 is on the opposite end of the wedge plate 36 from the cap 44. The pivot attachment plate 46 is part of the pivot attachment mechanism 32. The pivot attachment plate 46 is a U-clamp extending from the end of the wedge plate 36. The pivot arm 18 seats within the pivot plate 46. The pivot attachment plate 46 has holes 33 therethrough for the pin 34 to attach the pivot arm 18 to the wedge plate 36, as described above.

The portion of the cap 44 that extends beyond the wedge plate 36 includes a pre-loaded wedging element 42 attached thereto. The pre-loaded wedging element 42 includes a wedge spring 48 and a wedge 50. The spring 48 extends between the wedge element 50 and the cap 44. The spring 48 applies force to the wedge 50 and urges the wedge 50, between the wedge plate 36 and the pivot arm 18, towards the pivot point 26, preventing the pivot arm 18 from rotating counterclockwise. As the tension spring 16 pulls on the pivot arm 18, the pivot arm 18 is pivoted outwardly away from the wedge plate 36 and the wedge 50 is forced towards the pivot point 26 locking the pivot arm 18 in place which in turn applies the minimum static tension on the belt/cable 28.

The wedge 50 may be a cylindrical element or other shapes that allow for movement and securement within the angle of the pivot arm 18 and wedge plate 36. For example, the wedge 50 can be a round ball, or oblong ball. The wedge angle range is about 10 degrees. This prevents the wedge 50 from being pushed out by the force produced by the belt/cable 28. Extending from the wedge plate 36 on the opposite side from the pivot arm 18 is a wedge wing 38. FIG. 1 shows the wedge wing 38 as a triangular extension piece attached to the wedge plate 36 at the hypotenuse. The wedge wing 38 has an elongated curved mounting slot 52 therethrough and a locking pin 54 extending within the slot 52. The mounting slot 52 is used to adjust and lock the tensioning system device 10 in place to accommodate different belt/cable lengths.

Figure 2:
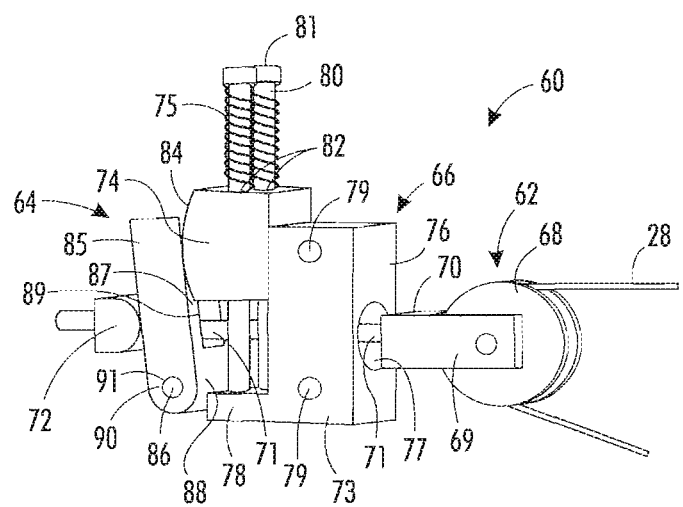
FIG. 2 shows an automatic belt/cable a tensioning system of a drive device.

FIG. 2 shows a tensioning system device 60 that is similar to the tensioning system 10 of FIG. 1 including idler pulley mechanism 62, a pivot mechanism 64 and a locking mechanism 66. The idler pulley mechanism 62 includes a one-way clutch shaped pulley 68 which engages with the belt/cable 28 about the circumference of the pulley 68. The pulley 68 is attached to a U-clamp 69. The U-clamp 69 is attached to the center of the pulley 68 and extends in either side of the pulley 68. The pulley 68 is allowed to spin freely within the U-clamp 69. The base 70 of the U-clamp 69 has a rod 71 extending therefrom. The opposite end of the rod 71 from the pulley 68 is a split cylindrical stopper 72. The rod 71 extends through the curved perimeter of the stopper 72 and exits through the flat surface. The stopper 72 assists in the movement of the pulley mechanism 62.

Figure 3:
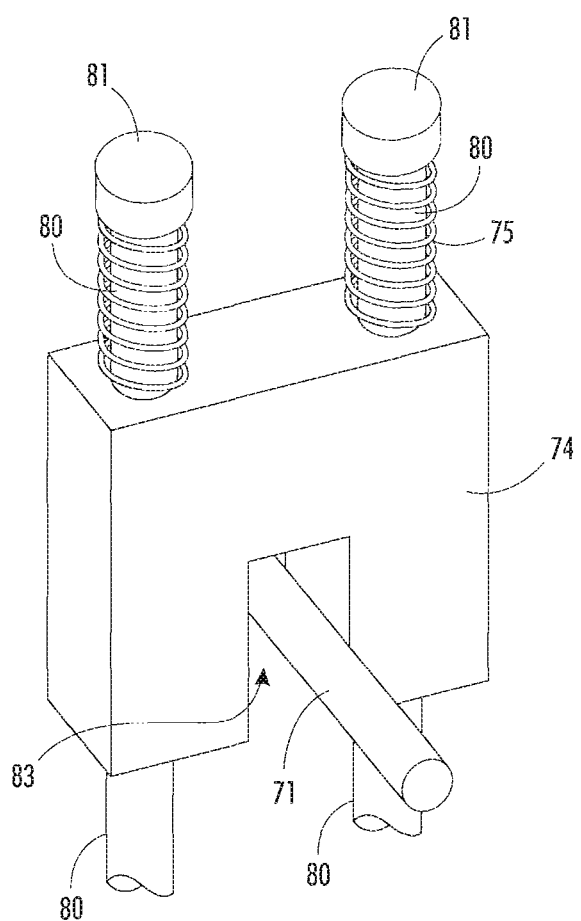
FIG. 3 shows a wedge element of FIG. 2.

The locking mechanism 66 includes a wedge plate 73, wedge element 74, compression springs 75. The wedge plate 73 is L-shaped with an elongated thicker leg 76 and a shorter thinner base plate 78 extending from one end of the leg 76. The wedge plate 73 is adjacent the U-clamp 69. The wedge plate 73 includes attachment points 79 through the leg 76 to attach the wedge plate 73 to a support structure. The wedge plate 73 includes an opening 77 therethrough. The opening 77 permits the rod 71 of the pulley mechanism 62 to extend therethrough. The base plate 78 extends in the opposite direction from the pulley 68. A pair of parallel, spaced apart rods 80 extends perpendicularly from the base plate 78. The pair of rods 80 extends parallel to the leg 76 of the wedge plate 73. The pair of rods 80 includes top caps 81 which have a larger diameter than the rods 80. Wrapped about each rod 80 is a compression spring 75 with a diameter less than a diameter the top caps 81. The compression springs 75 extend between the top cap 81 and the wedge element 74. The wedge element 74 is a generally square cube with one curved side. The wedge element 74 includes a pair of holes 82 which are positioned to allow the pair of rods 80 to extend therethrough. The wedge element 74 is vertically moveable along the length of the rods 80. The pair of holes 82 have a smaller diameter than the diameter of the compression springs 75 so that the compression springs 75 are unable to enter through the pair of holes 82. Extending between the pair of rods 80 and below the wedge element 74 is the rod 71 from the pulley mechanism 62. FIG. 3 shows the wedge element 74 includes a U-shaped channel 83 through the bottom surface between the pair of holes which allow for the rod 71 of the pulley mechanism 62 to extend therethrough as the wedge element 74 is pushed closer to the base plate 78 by the compression spring 75.

The wedge element 74 is sandwiched between the wedge plate 73 and the pivot mechanism 64. The curved surface 84 of the wedge element 74 is in contact with the pivot mechanism 64. The pivot mechanism 64 includes an elongated pivot arm 85 and a pivot point 86 at one end. The pivot arm 85 has a U-shaped geometry with a pair of parallel extending sides 87 and a base 88 extending between the pair of sides 87. The channel 89 of the U-shaped geometry allows for the rod 71 of the pulley mechanism 64 to extend therethrough. The base 88 of the pivot arm 85 is aligned with the base plate 78 of the wedge plate 73 and the extending sides 87 of the pivot arm 85 are in communication with the curved surface 84 of the wedge element 74. The pivot point 86 extends through the base 88 of the pivot arm 85. The pivot point 86 is a hole 90 in which a fastener 91 extends therethrough. The fastener 91 attaches the pivot arm 85 to a support structure. The pivot arm 85 is sandwiched between the wedge element 74 and the stopper 72 of the pulley mechanism 62. The curved surface of the stopper 72 is in communication with the surface of the pivot arm 85.

The tensioning system of FIG. 2 operates in a similar manner as the tensioning system of FIG. 1. The compression springs 75 apply a constant downward force against the wedge element 74. The wedge element 74 is guided downwardly by the pair of rods 80. The wedge element 74 pushes against the pivot arm 85. The pivot arm 85 pivots outwardly towards the stopper 72 of the pulley mechanism 62. The pivot arm 85 applies a force against the stopper 72 which moves the pulley mechanism 62 in the opposite direction from the belt/cable 28 until the forces are equal. Specifically, the force from the belt/cable 28 is equal with the force applied to the stopper 72. Once the forces are equal the system is at equilibrium and the proper minimum tension is applied to the belt/cable 28. During use of the belt/cable 28, the belt/cable 28 will stretch and loosen. The slack in the belt/cable 28 reduces the pull force from belt/cable 28 to the pulley mechanism 62. Thus, the pulley mechanism 62 is moved toward the pivot arm 85. The tensioning system 60 migrates to the new equilibrium tension force by having the compression springs 75 move the wedge element 74 down, closer to the base plate 78 of the wedge plate 73. As the wedge element 74 moves downwardly, it pushes against the pivot arm 85 and forces the pivot arm 85 to rotate counterclockwise. As the pivot arm 85 moves counterclockwise against the stopper 72, the pulley mechanism 62 is moved closer to the wedge plate 73. These elements are readjusted until the forces are equal between the tension from the belt/cable and the force from the compression springs 75 restoring the proper minimum tension.

Additionally, the curved surface 84 of the wedge element 74 allows for the wedge element 74 to migrate down the pivot arm 85 without sticking or slipping, and it allows for the wedge element 74 to lock into place, insuring that the maximum dynamic tension is not a function of the minimum static tension.

Figure 4:
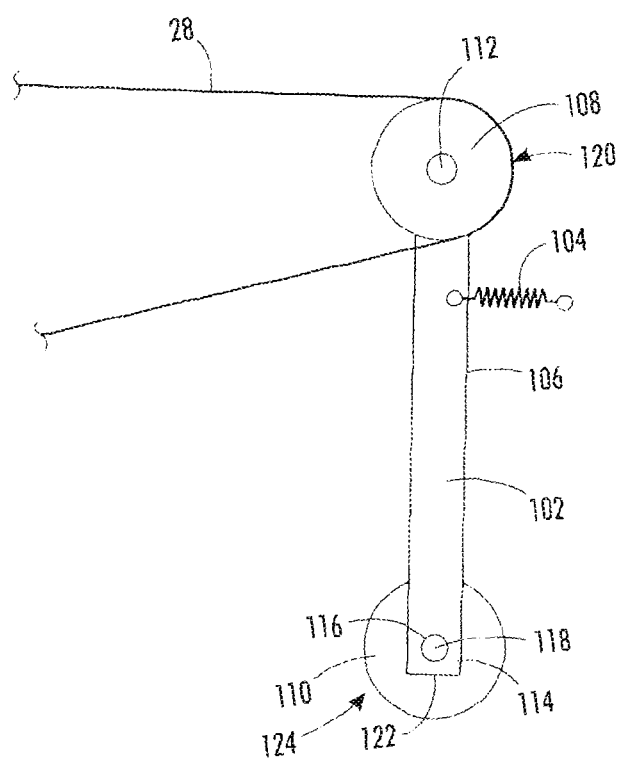
FIG. 4 shows an automatic belt./cable tensioning system of a drive device.

FIG. 4 is another tensioning system 100 that is similar to the previously tensioning systems including a pivot mechanism 102, locking mechanism 124 and tensioning spring 104. The tensioning system 100 of FIG. 4 is designed to fixed to a support structure at the pivot mechanism 102. The pivot mechanism 102 includes a pivot arm 106 which is generally rectangular in shape with a pulley 108 on the first end 120 and a locking mechanism 124 on the second end 122. The locking mechanism is a one-way clutch 110. The pulley 108 is attached to the pivot arm 106 at the rotational point 112. The belt/cable 28 extends about the pulley 108 and the pulley 108 is free to rotate as the belt/cable 28 moves thereabout. The second end 122 of the pivot arm 106 is a U-shaped end 114 with the one-way clutch 110 located within the channel of the U-shaped end 114. The one-way clutch 110 is attached to the pivot arm 106 at the pivot point 116. A pin 118 is inserted through the holes in the pivot arm 106 and the hole in the one-way clutch 110. The one-way clutch 110 is attached such that it is able to rotate freely in a direction that would tension the belt/cable. Between the first end 120 and the second end 122 of the pulley arm 106 is a tension spring 104 which is attached to a support structure. The tensions spring 104 applies a counterweight force against the tension of the belt/cable 28. As the tension in the belt/cable 28 reduces the tension spring 104 pulls the pivot arm 106 closer to the support structure, and as the pivot arm 106 is pulled towards the support structure it rolls on the one-way clutch 110 away from the support structure to balance the forces. The one-way clutch 110 provides a locking mechanism by the friction between the surface with the one-way clutch 110 is resting on and the one-way clutch 110.

Having described the aspects herein, it should now be appreciated that variations may be made thereto without departing from the contemplated scope. Accordingly, the aspects described herein are deemed illustrative rather than limiting, the true scope is set forth in the claims appended hereto.

What is claimed is:

1. An automatic tensioning system, comprising:
a pivot mechanism including a pivot arm extending between an idler pulley and a pivot point, said idler pulley is mateable with a belt, said belt routed about said idler pulley, wherein said idler pulley rotates by the movement of the belt, said pivot arm being pivotal in a first rotational direction at said pivot point whereby tension is applied to said belt; and
an adjustable locking mechanism in communication with said pivot arm, said locking mechanism being coaxially pivotal with said pivot arm at said pivot point, separately from said pivot arm, said locking mechanism including a wedge surface and a wedge, said wedge is sandwiched between said wedge surface and said pivot arm, and at least one compression spring arranged to apply force to said wedge in a direction towards said pilot point and between said pivot arm and said wedge surface, wherein pivot arm is pivotable in said first rotational direction and away from said wedge, the adjustable locking mechanism further having a wedge wing, said wedge wing extending from said wedge surface, said wedge wing including an elongated slot and a locking pin extending therein, said wedge wing and elongated slot provide for adjustment of said locking mechanism, said wedge wing locking said locking mechanism in a position corresponding to a predetermined minimum tension setting of said belt.

2. The automatic tensioning system of claim 1 further including a tension spring attached to said pivot arm between said idler pulley and said pivot point, said tension spring provides tension in said belt.

3. The automatic tensioning system of claim 1 wherein the wedge surface has an L-shaped geometry including an elongated portion and a top cap perpendicularly extending from said elongated portion.

4. The automatic tensioning system of claim 3, wherein said compression spring extends between said top cap a wedge.

5. The automatic tensioning system of claim 1 wherein said wedge surface includes an attachment surface attaching said wedge surface to said pivot point, said attachment surface includes a U-clamp and a fastening element extending through a hole in said U-clamp, said elongated portion of said wedge surface extends between said top cap and said attachment surface.

6. The automatic tensioning system of claim 1 wherein said wedge is cylindrical.

7. The automatic tensioning system of claim 1 wherein said wedge includes a curved surface.

* * * * *